United States Patent [19]

Komiyama et al.

[11] Patent Number: 4,557,380
[45] Date of Patent: Dec. 10, 1985

[54] MAGNETIC TAPE CASSETTE AND STORAGE CASE

[75] Inventors: Choji Komiyama; Kengo Oishi; Osamu Suzuki, all of Kanagawa; Yasumasa Iyota, Tokyo, all of Japan

[73] Assignee: Fuji Photo Film Co., Ltd., Kanagawa, Japan

[21] Appl. No.: 632,147

[22] Filed: Jul. 18, 1984

[30] Foreign Application Priority Data

Jul. 18, 1983 [JP] Japan ............................ 58-111380

[51] Int. Cl.⁴ .......................................... B65D 85/67
[52] U.S. Cl. .................................... 206/387; 206/819
[58] Field of Search ............................. 206/387, 819

[56] References Cited

U.S. PATENT DOCUMENTS

| 4,063,370 | 12/1977 | Saito | 206/387 |
| 4,135,316 | 1/1979 | Saito | 206/387 |
| 4,306,690 | 12/1981 | Izaki et al. | 206/387 |
| 4,365,712 | 12/1982 | Oishi et al. | 206/387 |

Primary Examiner—Joseph Man-Fu Moy
Attorney, Agent, or Firm—Sughrue, Mion, Zinn, Macpeak & Seas

[57] ABSTRACT

A magnetic tape cassette system is described, comprising a magnetic tape cassette and a storage case therefor, wherein at least one of the magnetic tape cassette and the storage case is molded using a resin composition containing from 75 to 95% by weight of α-methylstyrene-acrylonitrile copolymer (A) and from 5 to 25% by weight of graft copolymer (B) obtained by reacting a polybutadiene-based rubber with monomers consisting of styrene and acrylonitrile, wherein said α-methylstyrene-acrylonitrile copolymer is a copolymer having a composition consisting of from 75 to 90% by weight of α-methylstyrene, from 10 to 25% by weight of acrylonitrile, and from 0 to 5% by weight of styrene, and 30% by weight or more of said α-methylstyrene-acrylonitrile copolymer is a copolymer component having a composition containing 82% by weight or more of α-methylstyrene.

7 Claims, 4 Drawing Figures

MAGNETIC TAPE CASSETTE AND STORAGE CASE

FIELD OF THE INVENTION

The present invention relates to a magnetic tape cassette and a storage case therefor (i.e., plastic case conventionally used for protecting a magnetic tape cassette), and particularly to a magnetic tape cassette and a storage case having excellent temperature stability and durability such that strain causing deformation hardly occur even if the cassette and storage case are stored at a high temperature.

BACKGROUND OF THE INVENTION

In recent years, the spread of magnetic recording media has been remarkable. Magnetic recording media have been used in one form or another in almost all homes, such as in the forms of audio magnetic tape cassettes and video magnetic tape cassettes. Audio cassettes have not only been used in stationary type stereo reproducing apparatus and radio cassette recorders, but have also been widely used for stereo systems in cars such as a private car, etc. The video cassettes have not only been used for stationary type video tape recording (VTR) but also portable VTR by which video imaging can be conducted outdoors. Moreover, in recent years, subminiature incorporated-camera type VTR called "8 mm video" has been studied.

Magnetic tape cassettes ordinarily used hitherto indoor have now been used outdoors, as described above, because of their easy handling and commercial availability. However, it is clear that conditions of use outdoors are typically more severe than those of use indoors. In the case of use or storage indoors, it is sufficient to consider a temperaure range of from 0° C. to 50° C. or so. However, in case of using outdoors, it is more typical that use or storage may encounter a temperature range of from $-40°$ C. to 120° C. A typical example of using outdoors is in stereo systems in cars. According to a standard by Corporate Juridical Person: Jidoshagijutsukai (JASO M317-75, standars inspection of plastic moldings for cars), the 1st grade condition for a temperature resisting test of car parts covers the range of from $-40°$ C. to 120° C. Such severe conditions for storage temperature required for such cases are too severe for the prior magnetic tape cassettes and storage cases which were designated so as to be used indoors.

Hitherto, magnetic tape cassettes and storage cases made of various materials are proposed, for example, in Utility Model Application (OPI) No. 167085/81, Utility Model Publication Nos. 12349/75 and 33539/76 and Japanese Patent Application (OPI) Nos. 41343/84, 154686/82 and 137173/83. However, their heat resisting temperature is at the most 70° C. to 80° C., or so. Therefore, in case that an audio cassette or the storage case therefor is left on the dashboard, the surface temperature may sometimes rise to 110° C. or more by direct exposure to the sun through the glass, and, consequently, the audio cassettes or the storage case may frequently be subject to thermal deformation, whereby it becomes impossible to insert the cassette into a car stereo deck, or it becomes impossible to accommodate the cassette in the storage case.

Further, even if the audio cassette does not undergo deformation, a label, which is typically applied to the surface of it, can undergo so-called label floating, because of expansion and contraction of the audio cassette by heat, since the label has a different coefficient of expansion and contraction. If such label floating occurs, it can cause the problem that the audio cassette can not be removed after it is inserted in the car stereo deck, because the label sticks to the inside of the deck.

In the case of the video cassette, there is even more possibility of such a problem occurring, because it is composed of a larger number of parts as compared with the audio cassette. For example, a front opening part for drawing the tape in the video cassette is covered with a covering member (hereinafter referred to as the guard panel) to provide for dustproofing. In many cases, the guard panel is composed of a plate having a nearly L-shaped section in order to cover the front opening part. This shape easily warps when heat is applied thereto. If deformation such as a warp, etc., is once caused, it becomes impossible thereafter to smoothly carry out opening and closing of the guard panel. In the video cassette, the tape is drawn from the video cassette and it is wound on a magnetic drum for reproduction of recording. Therefore, when the guard panel does not function normally, physical damage or a scratch which can not be recovered is applied to the magnetic tape by the guard panel.

Thus, since audio cassettes and video cassettes have been increasingly used outdoors, high temperature durability has been required for the magnetic tape cassettes and the storage cases.

Particularly, audio cassettes for car stereos used in cars must maintain good characteristics even though subjected to particularly severe conditions. Thus, it has been required that the characteristics are stably maintained generally at a temperature of 110° C. or higher.

SUMMARY OF THE INVENTION

The present invention provides a magnetic tape cassette system comprising a magnetic tape cassette and a storage case therefor which have high reliability obtaining high temperature stability and durability, by which the above described problems can be prevented.

The objects of the present invention can be attained by using, for at least one of the magnetic tape cassette and the case, a resin composition containing from 75 to 95% by weight of α-methylstyrene-acrylonitrile copolymer (A) and from 5 to 25% by weight of graft copolymer (B) obtained by reacting a polybutadiene-based rubber with monomers consisting of styrene and acrylonitrile, wherein said α-methylstyrene-acrylonitrile copolymer is a copolymer having a composition consisting of from 75 to 90% by weight of α-methylstyrene, from 10 to 25% by weight of acrylonitrile and from 0 to 5% by weight of styrene, and 30% by weight or more of said α-methylstyrene-acrylonitrile copolymer is a copolymer component having a composition containing 82% by weight or more of α-methylstyrene. Use of the resin composition according to the present invention, instead of polystyrene or ABS resin as was used hitherto as a raw material for producing cassettes and cassette storage cases, provides heat resistance, and internal stress-strain generation in the case of molding is relieved to give stabilized strength.

In the Figures, 1 and 12 indicate reel hubs, 2 and 11 indicate fixed guide poles, 4, 5, 8 and 9 indicate fixed guide walls, 6 and 7 indicate fixed guide pins, 3 and 10 indicate guide rollers, 17 indicates a tape recorder, 18 indicates an oscillator, 19 indicates an apparatus for controlling the magnetic head angle, 20 indicates an amplifier, and 21 indicates a millivolt meter.

DETAILED DESCRIPTION OF THE INVENTION

The resin composition of the present invention preferably contains from 80 to 90% by weight of α-methylstyrene-acrylonitrile copolymer (A) and from 10 to 20% by weight of the graft copolymer (B).

The α-methylstyrene-acrylonitrile copolymer (A) is preferably a copolymer having a composition consisting of from 75 to 80% by weight of α-methylstyrene, from 20 to 25% by weight of acrylonitrile and from 0 to 5% by weight of styrene, and it is preferred that 35% by weight or more of the α-methylstyrene-acrylonitrile copolymer component having a composition containing 82% by weight or more of α-methylstyrene. The copolymer (A) imparts heat distortion resistance to the resulting magnetic tape cassette and storage case. In view of the moldability of the resin composition, however, the molecular weight of copolymer (A) should be controlled and the viscosity ($\eta$: in MEK at 30° C.) is preferably within the range of from 0.4 to 0.6.

The graft copolymer (B) is preferably obtained by reacting polybutadiene with the monomer components, i.e., styrene and acrylonitrile in the weight ratio of polybutadiene to the total monomer components of from 35/65 to 85/15. The weight ratio of styrene to acrylonitrile is not limited, but it is preferably from 3/2 to 4/1. The graft copolymer (B) impars impact strength to the resulting molded products.

The copolymer (A) and the graft copolymer (B) can be produced by a conventional manner, and an emulsion polymerization is generally carried out for the purpose because of its simplicity.

According to the present invention, the heat deformation temperature (hereinafter referred to as HDT; measurement by ASTM D-648-56) which is 80° C. or so in the case of using polystyrene or ABS resin, can be elevated to 110° C. or more. This heat deformation temperature is near the heat deformation temperature (135° C.) of PC (polycarbonate) resin used hitherto as a super heat resisting resin, and is sufficient for practical use. Further, the characteristics, including from an economic viewpoint, are excellent; for example, the price is lower than that of PC resin and injection molding is easily carried out.

In the following, the present invention is illustrated by examples.

Figure 1:
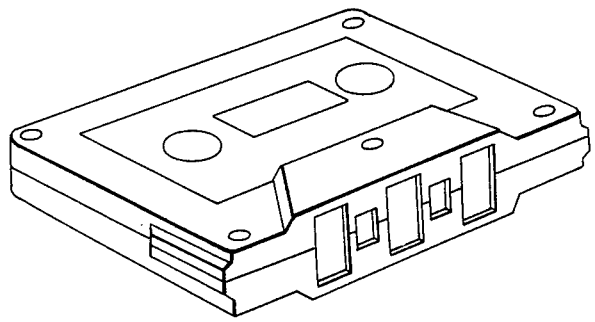
FIG. 1 is a perspective view of an audio cassette.

FIG. 1 shows a compact cassette as can be prepared in accordance with the present invention, in the form of a Phillips type compact cassette. The cassette contains a pair of magnetic tape reeling members and is composed of a pairs of guide rollers, shield plate, a tape pressing pad and a label and upper and lower cases containing them which are fixed by fixing screws.

Table 1 shows heat resistance of cassettes using the resin compositions of the present invention, that of cassettes using the prior used polystyrene resins and that of cassettes using other ABS resins.

As is well known, ABS resin is a copolymer composition usually composed of about 20% by weight of polybutadiene rubber, about 25% by weight of acrylonitrile, and about 55% by weight of styrene, the HDT value of which is about 80° C. (conventional ABS sample).

COMPARATIVE EXAMPLE 1

Molding was carried out using a resin composition composed of 80% by weight of α-methylstyrene-acrylonitrile copolymer having a composition consisting of 15% by weight of α-methylstyrene, 25% by weight of acrylonitrile and 60% by weight of styrene, which contained 3% by weight of a copolymer component having a composition containing 82% by weight or more of α-methylstyrene, and 20% by weight of a graft copolymer obtained by graft polymerization of 60% by weight of polybutadiene rubber with 28% by weight of styrene and 12% by weight of acrylonitrile. The HDT of the resulting sample was 90° C. (Sample No. 1).

COMPARATIVE EXAMPLE 2

Molding was carried out using a resin composition composed of 80% by weight of α-methylstyrene-acrylonitrile copolymer having a composition consisting of 25% by weight of α-methylstyrene, 25% by weight of acrylonitrile and 50% by weight of styrene, which contained 5% by weight of a copolymer component having a composition containing 82% by weight or more of α-methylstyrene, and 20% by weight of a graft polymer obtained by graft polymerization of 60% by weight of polybutadiene rubber with 28% by weight of styrene and 12% by weight of acrylonitrile. The HDT of the resulting sample was 95° C. (Sample No. 2)

COMPARATIVE EXAMPLE 3

Molding was carried out using a resin composition composed of 80% by weight of α-methylstyrene-acrylonitrile copolymer having composition consisting of 40% by weight of α-methylstyrene, 25% by weight of acrylonitrile and 35% by weight of styrene, which contained 9% by weight of a copolymer component having a composition containing 82% by weight or more of α-methylstyrene, and 20% by weight of a graft copolymer obtained by graft polymerization or 60% by weight polybutadiene rubber with 28% by weight of styrene and 12% by weight of acrylonitrile. The HDT of the resulting sample was 98° C. (Sample No. 3)

COMPARATIVE EXAMPLE 4

Molding was carried out using a resin composition composed of 80% by weight of α-methylstyrene-acrylonitrile copolymer having a composition consisting of 50% by weight of α-methylstyrene, 25% by weight of acrylonitrile and 25% by weight of styrene, which contained 20% by weight of a copolymer component having a composition containing 82% by weight or more of α-methylstyrene, and 20% by weight of a graft copolymer obtained by graft polymerization of 60% by weight of polybutadiene rubber with 20% by weight of styrene and 12% by weight of acrylonitrile. The HDT of the resulting sample was 104° C. (Sample No. 4)

EXAMPLE 1

Molding was carried out using a resin composition composed of 80% by weight of α-methylstyrene-acrylonitrile copolymer having a composition consisting of 78% by weight of α-methylstyrene and 22% by weight of acrylonitrile, which contained 30% by weight of a copolymer component having a composition containing 82% by weight or more of α-methylstyrene, and 20% by weight of a graft copolymer obtained by graft polymerization of 60% by weight of polybutadiene rubber with 28% by weight of styrene and 12% by weight of acrylonitrile. The HDT of the resulting sample was 112° C. (Sample No. 5)

EXAMPLE 2

Molding was carried out using a resin composition composed of 80% by weight of α-methylstyrene-acrylonitrile copolymer having a composition consisting of 77% by weight of α-methylstyrene and 23% by weight of acrylonitrile, which contained 35% by weight of a polymer component having a composition containing 82% by weight or more of α-methylstyrene, and 20% by weight of a graft copolymer obtained by graft polymerization of 60% by weight of polybutadiene rubber with 28% by weight of styrene and 12% by weight of acrylonitrile. The HDT of the resulting sample was 115° C. (Sample No. 6)

EXAMPLE 3

Molding was carried out using a resin composition composed of 80% by weight of α-methylstyrene-acrylonitrile copolymer having a composition consisting of 78% by weight of α-methylstyrene and 22% by weight of acrylonitrile, which contained 42% by weight of a copolymer component having a composition containing 82% by weight of α-methylstyrene, and 20% by weight of a graft copolymer obtained by graft polymerization of 60% by weight of polybutadiene rubber with 28% by weight of styrene and 12% by weight of acrylonitrile. The HDT of the resulting sample was 118° C. (Sample No. 7)

EXAMPLE 4

Molding was carried out using a resin composition composed of 80% by weight of α-methylstyrene-acrylonitrilestyrene copolymer having a composition consisting of 75% by weight of α-methylstyrene, 23% by weight of acrylonitrile and 2% by weight of styrene, which contained 30% by weight of a copolymer component having a composition containing 82% by weight or more of α-methylstyrene, and 20% by weight of a graft copolymer obtained in the same manner as in Example 3. The HDT of the resulting sample was 112° C. (Sample No. 8)

The composition and HDT of each sample are shown in Table 2.

TABLE 1

| Sample No. | Example and Comparative example | Storage Temperature | | | | |
|---|---|---|---|---|---|---|
| | | 80° C. | 90° C. | 100° C. | 110° C. | 120° C. |
| 1 | Comparative example 1 | No deformation | Slight deformation | Great deformation | Great deformation | Great deformation |
| 2 | Comparative example 2 | " | No deformation | Great deformation | Great deformation | Great deformation |
| 3 | Comparative example 3 | " | " | Slight deformation | Great deformation | Great deformation |
| 4 | Comparative example 4 | " | " | No deformation | Great deformation | Great deformation |
| 5 | Example 1 | " | " | " | No deformation | Slight deformation |
| 6 | Example 2 | " | " | " | " | No deformation |
| 7 | Example 3 | " | " | " | " | " |
| 8 | Example 4 | " | " | " | " | " |
| — | Conventional ABS sample | " | Slight deformation | Great deformation | Great deformation | Great deformation |
| — | Conventional PS sample | Slight deformation | Great deformation | Great deformation | Great deformation | Great deformation |

TABLE 2

(Measurement: ASTM D-648-56, load: 18.6 kg/cm$^2$)

| Example and Comparative Example | α-methylstyrene-Acrylonitrile copolymer | | | % by weight of component having 82% by weight or more of α-methylstyrene (%) | % by weight of α-methyl-styrene-acrylonitrile copolymer (%) | Graft Polymer | | | % by weight of graft polymer (%) | HDT (°C.) |
|---|---|---|---|---|---|---|---|---|---|---|
| | α-methyl styrene (%) | Acrylonitrile (%) | Styrene (%) | | | Polybutadiene (%) | Styrene (%) | Acrylonitrile (%) | | |
| Comparative Example 1 | 15 | 25 | 60 | 3 | 80 | 60 | 28 | 12 | 20 | 90 |
| Comparative Example 2 | 25 | 25 | 50 | 5 | 80 | 60 | 28 | 12 | 20 | 95 |
| Comparative Example 3 | 40 | 25 | 35 | 9 | 80 | 60 | 28 | 12 | 20 | 98 |
| Comparative Example 4 | 50 | 25 | 25 | 20 | 80 | 60 | 28 | 12 | 20 | 104 |
| Example 1 | 78 | 22 | 0 | 30 | 80 | 60 | 28 | 12 | 20 | 112 |
| Example 2 | 77 | 23 | 0 | 35 | 80 | 60 | 28 | 12 | 20 | 115 |
| Example 3 | 78 | 22 | 0 | 42 | 80 | 60 | 28 | 12 | 20 | 118 |

TABLE 2-continued (Measurement: ASTM D-648-56, load: 18.6 kg/cm²)

| Example and Comparative Example | α-methylstyrene-Acrylonitrile copolymer | | | % by weight of component having 82% by weight or more of α-methylstyrene (%) | % by weight of α-methyl-styrene-acrylonitrile copolymer (%) | Graft Polymer | | | % by weight of graft polymer (%) | HDT (°C.) |
|---|---|---|---|---|---|---|---|---|---|---|
| | α-methyl styrene (%) | Acrylonitrile (%) | Styrene (%) | | | Polybutadiene (%) | Styrene (%) | Acrylonitrile (%) | | |
| Example 4 | 75 | 23 | 2 | 30 | 80 | 60 | 28 | 12 | 20 | 112 |

Storage of samples used in Table 1 was carried out by allowing them to stand in a oven produced by Tabai Co. at each temperature indicated for 4 hours with circulating hot air. After the samples were removed and exposed to room temperature (about 20° C.), the state of deformation thereof was examined visually and by measuring the size by means of a vernier caliper.

Then, the change in the electromagnetic conversion characteristics of the audio cassette was examined.

Figure 2:
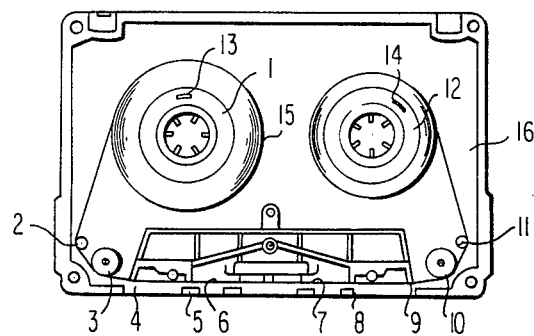
FIG. 2 is a planar view of an audio cassette wherein the upper half part is removed.

In the audio cassette, as shown in FIG. 2, the magnetic tape is sent out from the hub 1 and carried through a fixed guide pole 2, a guide roller 3, fixed guide walls 4 and 5 and a fixed guide pin 6 to come in contact with the magnetic head. After it is carried through a fixed guide pin 7, fixed guide walls 8 and 9, a guide roller 10 and a fixed guide pole 11, it is wound on a hub 12. In this case, if verticalities of the fixed guide pin 7 and the fixed guide wall 8 are bad, the tape can not be maintained in good contact with the head, thus resulting in a low output which is less than the normal reproduction output. It has been known that such poor verticalities of the fixed guides are closely related to the temperature durability of resin materials forming the cassettes.

Figure 3:
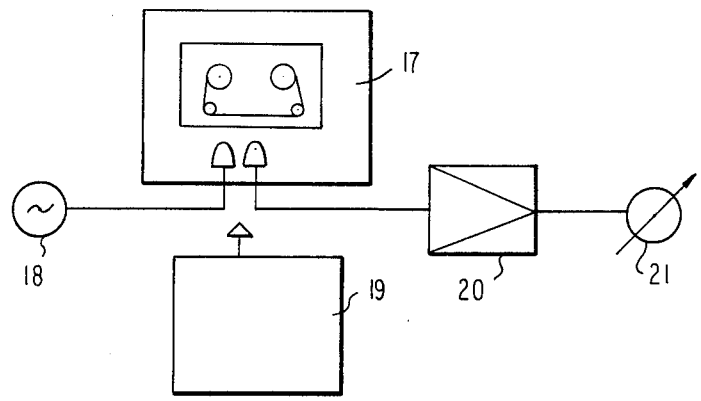
FIG. 3 is a diagram for measuring the characteristics of a cassette according to the present invention and that of the prior art.

As cassettes to be evaluated, cassettes of sample No. 6 of the present invention, sample No. 3 and conventional ABS sample were used. After the cassettes were allowed to stand in the oven produced by Tabai Co. at each temperature for 4 hours with circulating hot air, they were removed and exposed to room temperature, and measurements thereon was carried out after 1 hour. As a tape recorder, "NAKAMICHI 1000" produced by Nakamichi Kenkyusho Co. was used for measurement. The angle of the magnetic head was controlled so that a reproduction output of 8 KHz signals by A-face traveling showed a peak value. Thereafter, lowering of the reproduction output of the same signals by B-face traveling was determined by means of an AC millivoltmeter "LMV-185A" produced by Reader Denshi Co. The block diagram for measurement is shown in FIG. 3.

Figure 4:
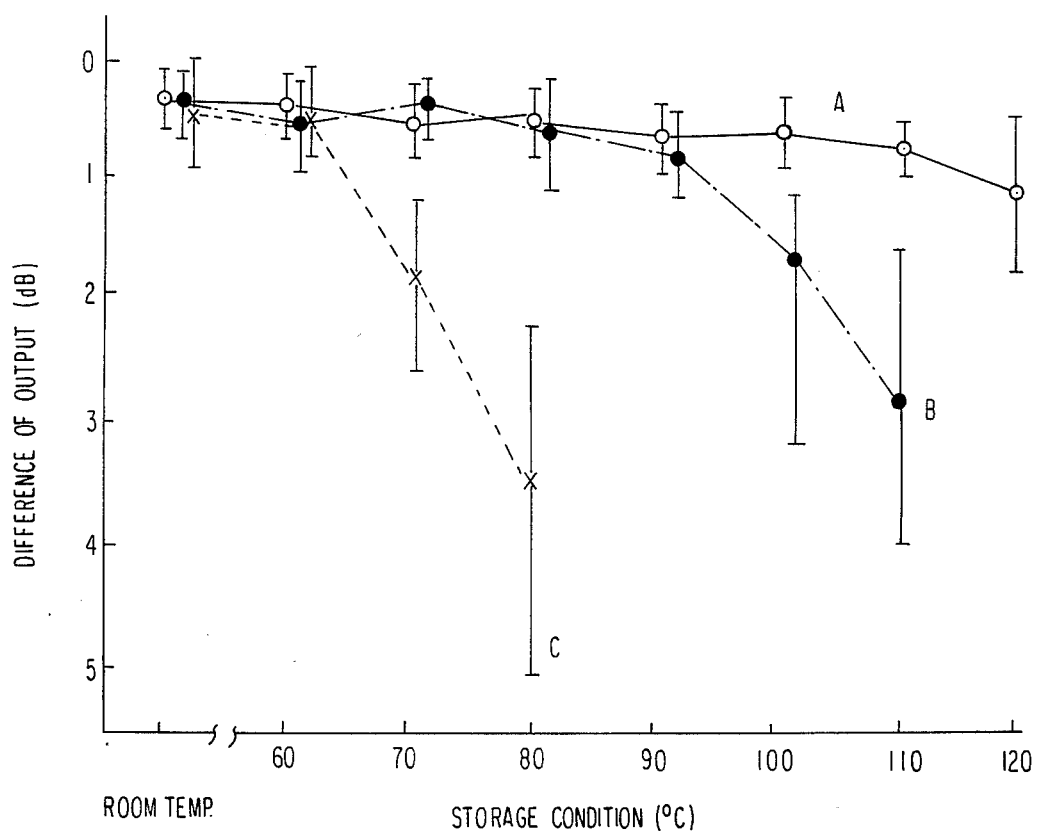
FIG. 4 is a graph indicating the results of measuring the temperature dependence of the electromagnetic characteristics of a cassette of the present invention and that of the cassettes of the prior art.

The relationship between the storage condition and the difference of reproduction output of the examined audio cassettes are shown in FIG. 4. In FIG. 4, A indicates the difference of reproduction output in case of the sample No. 6 of the present invention, B indicates that in case of sample No. 3, and C indicates that in case of conventional ABS sample.

It is understood that the cassette of the present invention shows good results under storage conditions at 110° C., while sample No. 3 and ABS sample showed dramatic deterioration at 110° C. or less, i.e., at a temperature less than is required as a heat resisting condition.

As described above, in cassettes and storage cases using resin compositions according to the present invention, since heat resistance is about 30° C. higher than that of cassettes and storage cases made of ABS resin used hitherto, they hardly undergo any deformation or strain when subjected to storage under high temperature conditions, and have high reliability. Further, deterioration of the electromagnetic conversion characteristics can be prevented, and the desired characteristics and functions can be sufficiently maintained under severe outdoor conditions.

In the examples, audio cassettes have been described, but the present invention can be applied, of course, to other uses, for example, video cassettes, cassette storage cases, and the like.

While the invention has been described in detail and with reference to specific embodiments thereof, it will be apparent to one skilled in the art that various changes and modifications can be made therein without departing from the spirit and scope thereof.

What is claimed is:

1. A magnetic tape cassette system comprising a magnetic tape cassette and a storage case therefor, wherein at least one of the magnetic tape cassette and the storage case is molded using a resin composition containing from 75 to 95% by weight of α-methylstyrene-acrylonitrile copolymer (A) and from 5 to 25% by weight of graft copolymer (B) obtained by reacting a polybutadiene-based rubber with monomers consisting of styrene and acrylonitrile, wherein said α-methylstyrene-acrylonitrile copolymer is a copolymer having a composition consisting of from 75 to 90% by weight of α-methylstyrene, from 10 to 25% by weight of acrylonitrile, and from 0 to 5% by weight of styrene, and 30% by weight or more of said α-methylstyrene-acrylonitrile copolymer is a copolymer component having a composition containing 82% by weight or more of α-methylstyrene.

2. A magnetic tape cassette system as in claim 1, wherein both the magnetic tape cassette and the storage case are molded using a resin composition as in claim 1.

3. A magnetic tape cassette system as in claim 1, wherein the magnetic tape cassette is molded using a resin composition as in claim 1.

4. A magnetic tape cassette system as in claim 1, wherein the storage case is molded using a resin composition as in claim 1.

5. A magnetic tape cassette system as in claim 1, wherein the resin composition contains from 80 to 90% by weight of said copolymer (A) and from 10 to 20% by weight of said graft copolymer (B).

6. A magnetic tape cassette system as in claim 1, wherein said copolymer (A) is a copolymer having a composition consisting of from 75 to 80% by weight of α-methylstyrene, from 20 to 25% by weight of acrylonitrile and from 0 to 5% by weight of styrene, and 35% by weight or more of said copolymer (A) is a copolymer component having a composition containing 82% by weight or more of α-methylstyrene.

7. A magnetic tape cassette system as in claim 1, wherein said graft copolymer (B) is obtained by reacting polybutadiene with said monomers in the weight ratio of polybutadiene to monomers of from 35/65 to 85/15.

* * * * *

UNITED STATES PATENT AND TRADEMARK OFFICE
CERTIFICATE OF CORRECTION

PATENT NO. : 4,557,380

DATED : December 10, 1985

INVENTOR(S) : Komiyama et al

It is certified that error appears in the above-identified patent and that said Letters Patent is hereby corrected as shown below:

On the cover page, following "[73] Assignee: Fuji Photo Film Co., Ltd., Kanagawa, Japan" kindly insert--and Kanagafuchi Chemical Industry Co., Ltd., Osaka, Japan--.

Signed and Sealed this

Twenty-ninth Day of April 1986

[SEAL]

*Attest:*

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,557,380
DATED : December 10, 1985
INVENTOR(S) : Komiyama et al

It is certified that error appears in the above-identified patent and that said Letters Patent is hereby corrected as shown below:

On the title page, following "(73) Assignee: Fuji Photo Film Co., Ltd., Kanagawa, Japan" insert -- and Kanegafuchi Chemical Industry Co., Lit., Osaka, Japan --.

This certificate supersedes Certificate of Correction issued April 29, 1986.

Signed and Sealed this

Fourteenth Day of October, 1986

[SEAL]

*Attest:*

DONALD J. QUIGG

*Attesting Officer*    *Commissioner of Patents and Trademarks*